United States Patent [19]
Hoffman et al.

[11] 3,855,398
[45] Dec. 17, 1974

[54] SODIUM CARBONATE AND BICARBONATE SPERULITES FROM CHLORINE ELECTROLYTIC CELL LIQUORS

[75] Inventors: Robert J. Hoffman, Liverpool; Alan G. Follows, Camillus, both of N.Y.

[73] Assignee: Allied Chemical Corporation, New York, N.Y.

[22] Filed: Apr. 12, 1973

[21] Appl. No.: 350,454

[52] U.S. Cl................. 423/422, 23/302, 423/186, 423/190, 423/266, 423/424, 423/426
[51] Int. Cl...... C01d 7/100, C01d 7/12, C01d 7/40
[58] Field of Search.......... 423/186, 187, 188, 189, 423/190, 209, 266, 419, 422, 423, 424, 425, 426, 427, 429; 23/300, 301 R, 302

[56] References Cited
UNITED STATES PATENTS

| | | | |
|---|---|---|---|
| 364,552 | 6/1887 | Solvay | 423/188 |
| 1,921,505 | 8/1933 | Chesney | 423/421 |
| 2,773,739 | 12/1956 | Burkholder | 23/302 |
| 2,842,489 | 7/1958 | Suanoe | 423/425 |
| 3,072,466 | 1/1966 | Bauer et al. | 23/300 |
| 3,719,745 | 3/1973 | Saeman | 423/427 |

OTHER PUBLICATIONS

Aslanyan, S., Comt. Rend. Acad. Bulgare Sci., 18(8), 759–762, 1965, as abstracted by Chemical Abstracts, Vol. 63, 1965, 17246f.

*Primary Examiner*—Oscar R. Vertiz
*Assistant Examiner*—Gary P. Straub
*Attorney, Agent, or Firm*—G. P. Rooney; G. H. Fuchs

[57] ABSTRACT

By-product sodium hydroxide/sodium chloride cell liquor obtained from the electrolytic production of chlorine serves as raw material for a method of producing spherulites of sodium bicarbonate, and an enriched sodium chloride/carbonate solution suitable for re-use, by the expedient of carbonating the cell liquor in the presence of 200 to 2,500 parts of a water-soluble alkaline phosphate, and recovering the spherulites of sodium bicarbonate from the enriched liquor. Sodium carbonate in the form of hard free-flowing spherules is readily obtained from the spherulites of sodium bicarbonate by calcination.

7 Claims, No Drawings

3,855,398

SODIUM CARBONATE AND BICARBONATE SPERULITES FROM CHLORINE ELECTROLYTIC CELL LIQUORS

CROSS-REFERENCE TO RELATED APPLICATION

In co-filed applications entitled:
"Method of producing Sodium Carbonate and Bicarbonate Spherules from Brine" and "Sodium Bicarbonate Spherulities from Sodium Sesquicarbonate," Ser. Nos. 350,453 and 350,454, respectively, methods are disclosed for producing a similar free flowing sodium bicarbonate product having spherical particles, using in the first case a 15 to 25 percent sodium chloride or carbonate solution as the feed material and in the second case, a 20 to 24 percent sodium sesquicarbonate solution as the feed material.

BACKGROUND OF THE INVENTION

1. Field of the Invention

By far the major portion of the chlorine produced in this country is the product of the electrolytic cell. Of these, there is a great variety which fall into two major categories, namely the mercury cells and the diaphragm cells. Of the two groups the greater proportion of chlorine today is, by far, the product of diaphragm cells.

In the electrolytic process using the diaphragm cell, brine is generally fed continuously and flows continuously from the anode compartment through an asbestos diaphragm backed by an iron cathode. To minimize back-diffusion and migration, the flow rate is always such that only part of the salt is converted. The hydrogen ions are discharged from the solution at the iron cathode, forming hydrogen gas and leaving hydroxyl ions. The solution containing caustic soda and unchanged sodium chloride may either be evaporated as is the usual practice, to obtain salable sodium hydroxide and sodium chloride for recycle, or it can be used as it comes from the electrolytic cells for the production of sodium bicarbonate spherulites and/or the production of sodium carbonate in a free-flowing dense form having spherical particles.

2. Description of the Prior Art

Attempts to improve the crystal structure of sodium bicarbonate have been made in the past and are the subject of continuing research. Emphasis has usually been placed on producing a larger, less fragile crystal than that normally obtained commercially. Sodium bicarbonate having a particle size greater than 100 mesh is preferred.

Crystallization techniques have been employed to produce relatively dense sodium carbonate and sodium bicarbonate, but these products are generally granular, and though relatively free flowing and less conductive to the production of dust than the more conventional varieties of sodium carbonate and bicarbonate, they nevertheless leave considerable room for improvement.

SUMMARY OF THE INVENTION

The present invention is particularly directed to a method for producing a novel and useful sodium bicarbonate in the form of small to fine crystalline spheres, using dilute NaOH/NaCl electrolytic cell liquor as starting material. These spherulites possess unusual properties heretofore not associated with this product. They may be characterized as hard, substantially uniform, free-flowing crystalline spherical particles of sodium bicarbonate which are much more durable than conventional sodium bicarbonate particles. Dust production on handling is minimal and good yields of material having a particle size greater than 100 mesh may be obtained.

Surprisingly, sodium bicarbonate spherulites retain their shape and hardness during calcining. A corresponding new form of sodium carbonate, therefore, may be prepared from this bicarbonate product.

A process is herein disclosed for producing sodium bicarbonate in the form of spherulites from a sodium hydroxide/sodium chloride solution comprising carbonating the solution under conditions sufficient to form sodium carbonate; introducing 200 to 2,500 parts per million (ppm) by weight of a water-soluble alkaline phosphate based on the weight of the above partially carbonated solution, continuing the carbonation of the solution until substantially all of the sodium carbonate present in the solution has been converted to sodium bicarbonate; and recovering the resulting sodium bicarbonate from the carbonated solution. The separated liquor is an enriched $NaCl/Na_2CO_3$ solution suitable for re-use, for example, in the Solvay Process for carbonate production.

The sodium hydroxide/sodium chloride feed stock for the process of this invention may be the weak electrolytic cell liquor obtained from typical diaphragm cells, which generally contains 8 to 15 percent by weight sodium hydroxide and is substantially saturated with sodium chloride (15–24 percent by weight).

The recovered sodium bicarbonate spherulites obtained are dried, providing a free-flowing sodium bicarbonate product.

If a sodium carbonate product consisting of comparatively hard, free-flowing spherules is desired, it is only necessary to calcine the sodium bicarbonate spherulites at temperatures ranging from about 150° to 350° C.

DESCRIPTION OF THE PREFERRED EMBODIMENTS

Utilization of NaOH/NaCl liquors is of special interest because of the large amount of weak cell liquor which is produced as a by-product of the manufacture of chlorine gas in diaphragm-type electrolytic cells. Such weak cell liquor generally contains about 8 to 15 percent by weight sodium hydroxide, and is substantially saturated with sodium chloride (about 15 to 24 percent). In carrying out the method of the present process, such liquor is carbonated, preferably by the introduction of carbon dioxide gas with agitation at a temperature initially below about 45°C. The carbonation is continued until substantially all of the sodium hydroxide is converted to the carbonate. The temperature increases during this neutralization step to about 45°C. Preferably, it remains below about 70°C. This first carbonation step can be nicely monitored by means of a pH meter, the carbonation being stopped preferably, when the pH drops to about 10.4 to 10.6, or more desirably to 10.5.

It is not essential that all the hydroxide be converted to the carbonate or that the pH be precisely within the preferred range, but it is desirable to make sure that there is insufficient NaOH remaining in solution to hydrolyze the phosphate additive, the introduction of which follows the first carbonation step.

Between 200 and 2,500 ppm, preferably between 300 and 2,000 ppm, or more desirably between about 1,200 and 2,000 ppm by weight of a water-soluble alkaline phosphorus-containing compound is added. This may be an alkali metal or alkaline earth metal phosphate, hypophosphate, phosphite, hypophosphite or phosphide. Preferably, it is a water-soluble alkali metal phosphate selected from the group consisting of $(NaPO_3)_6$; $K_5P_3O_{10}$; $Na_5P_3O_{10}$; $Na_4P_2O_7$ and $K_4P_2O_7$. More desirably, it is the alkaline phosphate $(NaPO_3)_6$ (sodium hexametaphosphate - SHMP).

Carbonation of the solution is now continued until substantially all of the sodium ions present have been carbonated. Preferably, the solution is cooled to below about 35°C. The rate of cooling is one of the factors controlling the particle size, since slow cooling tends to produce large particles.

The sodium bicarbonate that crystallizes out is in the form of small crystalline spheres composed of elongated crystals radiating outwardly from a central point. These we refer to as spherulites, or crystalline spherules. This product is separated from the liquor which is now an enriched sodium chloride/sodium carbonate solution suitable for re-use, as for example as feed stock in the Solvay Process. The handling of this slurry, particularly the filtering step, is facilitated by the spherical nature of the particles. Generally, the product is separated by rotary vacuum filters or in cycle-controlled, continuously running centrifuges.

The bicarbonate spherulites may be washed sparingly with water, with a solution of sodium bicarbonate, and/or, if desired, with organic solvents such as acetone.

The size, form and hardness of the spherulites can be controlled by the choice and concentration of the phosphorus-containing additive and the temperature and rate of cooling during crystallization. A very desirable spherule can be obtained in commercial operation using 1,600 ppm sodium hexametaphosphate as the additive, and a carbonation temperature of about 45°C., followed by crystallization with the temperature slowly dropping with agitation to about 30°C.

If it is desired to obtain hard spherules of sodium carbonate, these may be readily obtained by calcining the bicarbonate product at temperatures ranging from about 175 to 350°C. Surprisingly the spherulites retain their spherical form, with no appreciable loss in strength.

The ability of $K_5P_3O_{10}$; $Na_5P_3O_{10}$; $K_4P_2O_7$ and $Na_4P_2O_7$ to produce spheres is considerably less than that of the preferred phosphate $(NaPO_3)_6$. These compounds tend to form a particle intermediate between the normal crystal and the fully developed sphere.

EXAMPLE 1

500 Milliliters (ml) of weak electrolytic cell liquor containing 105 grams (g)/liter (l) NaOH and 187 g/l NaCl was placed in a one-liter beaker equipped with stirrer, thermometer and pH meter. The solution was carbonated with pure $CO_2$ at room temperature, using a fritted glass sparger, at the rate of 1,500 ml/min. Conversation of NaOH to $Na_2CO_3$ was monitored by means of the pH meter. (Addition of sodium hexametaphosphate (SHMP) was delayed until the bulk of the NaOH was converted to $Na_2CO_3$ to avoid hydrolysis of the SHMP in a strongly alkaline solution.) When a pH of 10.5 was obtained, 1,000 ppm SHMP (based on the total weight of the partially carbonated solution) was added, and the carbonation continued.

The temperature again increased slightly as the solids precipitated. The product (50 g) was separated by filtration, washed with saturated $NaHCO_3$ solution and thus recovered in the form of individual hard, free-flowing crystalline spheres.

The screen analysis of this product is tabulated below:

TABLE I

| U.S. STANDARD SIEVE (MESH) | SCREEN ANALYSIS SPHERICAL $NaHCO_3$ FROM NaOH | | |
|---|---|---|---|
| | | WEIGHT GRAMS | % OF TOTAL SOLIDS |
| on | 40 | 1.5 | 3.0 |
| do. | 60 | 6.3 | 12.6 |
| do. | 80 | 17.6 | 35.2 |
| do. | 100 | 12.8 | 25.6 |
| do. | 140 | 8.0 | 16.0 |
| do. | 170 | 2.0 | 4.0 |
| do. | 200 | 1.5 | 3.0 |
| through | 200 | .3 | 0.6 |

Note that better than 76 percent remained on the 100 mesh screen, and only 0.6 percent of fines were obtained (through 200 mesh).

EXAMPLE II

270 Ml of weak cell liquor containing 105 g/l NaOH and 187 g/l NaCl was treated differently than the liquor of Example I in that it was diluted with 30 ml of water prior to being carbonated. SHMP, in the amount of 1,667 ppm, was then added and the carbonation continued. The sodium bicarbonate product was separated, washed with saturated sodium bicarbonate solution and dried. Dried product, 46.8 g. Although a good percentage of the spherules were true spherulites, many others, although rounded, were not true spheres. These appeared to be the result of early agglomeration during the period of crystallization. Being limited to outward crystal growth, openings and hollows in the agglomerates were obtained. This suggests means of density control.

EXAMPLE III

500 Ml of weak cell liquor containing 132 g/l NaOH and 187 g/l NaCl was carbonated as previously described in the presence of 1,500 ppm SHMP. Although free-flowing spheres were obtained, microscopic examination suggested that many of them comprised an inner spherulite with a concentric crystalline shell which did not always completely enclose the inner core. Frequently the inner spherulite was half enclosed, thus producing a crystalline particle consisting outwardly of two joined hemispheres, one having a somewhat greater radius than the other.

Less than ideal feed liquor and SHMP concentrations can result in excessive agglomeration or sphere formation with adhering fine particles, which make the product most difficult to screen.

Where agitation is particularly vigorous, causing attrition of the particles, the spheres tend to break up into conical sections which are still durable, dust free, and of appreciable mesh size. This is in contrast with the dusty fines normally encountered with conventional material.

Spheres prepared at optimum fed liquor and SHMP concentrations to obtain maximum yields consist of hard, smooth, or spiky particles with a density range in the order of 700–1,200 g/l at all mesh sizes. Less than ideal conditions will tend to produce agglomerates the bulky density of which may be somewhat less because of their irregular shape and/or because they are soft. The temperature range for the production of spherical sodium bicarbonate lies preferably between ambient and about 70°C. Most runs made were initiated at room temperature with the heat of neutralization and reaction raising the temperature to about 45° to 60°C. Tests run at 50°–60°C. showed some tendency toward larger spheres, but with no other immediate advantage. Temperatures above 70°C. were avoided because of an increased tendency for the product to decompose.

The hard spherulites not only have the characteristic of being free-flowing, substantially free of dust and having greater density, but they dissolve more slowly, thus permitting a lower concentration per unit time. Where it is desirable, effectiveness of the sodium bicarbonate over a longer period of time is achieved.

Tests were run with 1,500 ppm of $Na_5P_3O_{10}$, with 1500 ppm of $K_4P_2O_7$ and with 1,500 ppm of $K_5P_3O_{10}$. Whereas the particles obtained tend to be spherical and are more dense and free-flowing than more conventional material, these phosphates lack the degree of effectiveness of the preferred sodium hexametaphosphate.

Since changes may be made in carrying out the above process without departing from the scope of the invention, it is intended that all matter contained in the above description shall be interpreted as illustrative and not in a limiting sense.

We claim:

1. A process for producing sodium bicarbonate in the form of crystalline spherules from a sodium hydroxide/sodium chloride solution comprising:
   a. carbonating the solution under conditions sufficient to form sodium carbonate;
   b. introducing 200 to 2,500 parts per million (ppm) by weight of a water-soluble alkaline phosphorus-containing compound selected from the group consisting of alkali metal and alkaline earth metal phosphates, hypophosphates, phosphites, hypophosphites and phosphides;
   c. continuing the carbonation of the solution until substantially all of the sodium carbonate present in the solution has been converted to sodium bicarbonate; and
   d. recovering the resulting sodium bicarbonate from the carbonated solution.

2. The process of claim 1 wherein the product sodium bicarbonate is calcined at temperatures ranging from 150° to 350°C. to provide a sodium carbonate product substantially in the form of hard spherical particles.

3. The process of claim 1 wherein the sodium hydroxide/sodium chloride solution is weak cell liquor from the electrolytic production of chlorine and sodium hydroxide from salt brine.

4. The process of claim 3 wherein the weak cell liquor contains about 8 to 15 percent by weight sodium hydroxide and about 15 to 24 percent by weight sodium chloride.

5. The process as claimed in claim 1 wherein the water-soluble alkaline phosphate is selected from the group consisting of $(NaPO_3)_6$; $K_5P_3O_{10}$; $Na_5P_3O_{10}$; $Na_4P_2O_7$ and $K_4P_2O_7$.

6. The process as claimed in claim 5 wherein the alkaline phosphate is $(NaPO_3)_6$ and the quantity used is within the range of 300 to 2,000 ppm.

7. A process for producing sodium bicarbonate in the form of spherulites from weak electrolytic sodium hydroxide/sodium chloride cell liquor containing 8 to 15 percent by weight sodium hydroxide and 15 to 24 percent by weight sodium chloride, comprising:
   c. carbonating the solution with carbon dioxide until the bulk of the sodium hydroxide has been converted to sodium carbonate at a temperature below about 70°C.;
   b. introducing about 300 to 2,000 ppm of sodium hexametaphosphate into the solution;
   c. continuing the carbonation at a temperature below about 70°C. until the sodium carbonate formed is converted to sodium bicarbonate; cooling the solution to below about 35°C. and separating the sodium bicarbonate spherulites formed from the carbonated solution.

* * * * *